(12) United States Patent
Rahim et al.

(10) Patent No.: US 8,285,527 B2
(45) Date of Patent: Oct. 9, 2012

(54) METHOD AND SYSTEM FOR EQUIVALENCE CHECKING

(75) Inventors: Solaiman Rahim, San Diego, CA (US); Pradeep Kumar Nalla, Noida (IN)

(73) Assignee: Atrenta, Inc., San Jose, CA (US)

( * ) Notice: Subject to any disclaimer, the term of this patent is extended or adjusted under 35 U.S.C. 154(b) by 250 days.

(21) Appl. No.: 12/785,986

(22) Filed: May 24, 2010

(65) Prior Publication Data

US 2011/0288825 A1    Nov. 24, 2011

(51) Int. Cl.
*G06F 17/50* (2006.01)
*G06F 3/00* (2006.01)

(52) U.S. Cl. .................. 703/2; 703/14; 703/17; 716/104

(58) Field of Classification Search ................ 703/2, 14, 703/17; 716/89, 104, 105
See application file for complete search history.

(56) References Cited

U.S. PATENT DOCUMENTS

| | | |
|---|---|---|
| 2007/0220461 A1 | 9/2007 | Baumgartner et al. |
| 2008/0209370 A1 | 8/2008 | Koelbl et al. |
| 2008/0288901 A1 | 11/2008 | Barowski et al. |
| 2009/0138837 A1 | 5/2009 | Baumgartner et al. |
| 2010/0198420 A1* | 8/2010 | Rettger et al. ................ 700/291 |
| 2010/0204844 A1* | 8/2010 | Rettger et al. ................ 700/291 |
| 2010/0231045 A1* | 9/2010 | Collins et al. ................... 307/47 |
| 2011/0084551 A1* | 4/2011 | Johnson et al. ................ 307/24 |

OTHER PUBLICATIONS

Myoung-Jin Nam, et al., "SAT-Based Combination Equivalence Checking with Don't Care," Department of Computer Science and Engineering, Korea University, 4 pages.

* cited by examiner

*Primary Examiner* — Thai Phan
(74) *Attorney, Agent, or Firm* — Sughrue Mion, PLLC (57) ABSTRACT

As part of the design process it is required to design circuits in order to reduce their power consumption. This is typically done by enabling or disabling flip-flops (FFs), however, such change in the circuit requires certain verification. As sequential clock gating changes the state function it is necessary to perform a sequential equivalence checking (SEC) verification. Applying a full SEC may be runtime consuming and is not scalable for large designs. Methods to reduce the problem of verifying sequential clock gating by reducing the sequential problem into much smaller problem that can be easily solved is therefore shown.

15 Claims, 8 Drawing Sheets

METHOD AND SYSTEM FOR EQUIVALENCE CHECKING

TECHNICAL FIELD

The present disclosure relates to the field of circuit design verification and in particular integrated circuit design verification. More particularly, the present disclosure relates to a system, method and computer program product for scalable sequential equivalence checking.

BACKGROUND OF THE INVENTION

To reduce clock power consumption many designers use clock enable signals to clock gate flip flops. To implement clock gating it is necessary to identify enable signals in the design. Typically, designers include some explicit enable signals in a circuit design which can be identified by looking at the combinational logic of a particular flip-flop (FF). Such explicit enable signals that are identifiable by looking at the combinational logic of an FF are referred to as combinational enable signals. These combinational enable signals are usually identified during the synthesis phase of the design process. The second class of enable signals is sequential enable signals. These enable signals can be identified by looking at the sequential behavior of the design. As soon as an enable signal, combinational or sequential, has been identified it can be used to clock gate the FF.

Power reduction tools typically identify potential clock gating and provide the user of the power reduction tools with the enable signal equations needed to clock-gate the FF. The user can perform the clock gating by implementing it manually or by instructing the power reduction tool to change the design automatically.

To verify the insertion of clock gating resulting from the identification of enable signals, equivalence checking is needed in order to verify that the design without clock gating, i.e., the golden design, is equivalent to the design with clock gating, i.e., the implementation design. As combinational clock gating does not change the state function, combinational equivalence checking (CEC) is sufficient to perform equivalence checking of the golden design versus the implementation design. Sequential clock gating changes the state function and hence, sequential equivalence checking (SEC) is needed to verify such kind of transformation. Applying full SEC may be runtime consuming and not scalable for large design.

It would therefore be advantageous to provide a solution for SEC which is runtime efficient. It would be further beneficial if such a solution is scalable to large circuit designs.

DETAILED DESCRIPTION OF THE INVENTION

As part of the design process it is beneficial to design circuits in order to reduce their power consumption. This is typically done by enabling or disabling flip-flops (FFs), however, such change in the circuit requires certain verification. As sequential clock gating changes the state function it is necessary to perform a sequential equivalence checking (SEC) verification. Applying a full SEC may be runtime consuming and may not be scalable for large designs. Exemplary methods and implementations to reduce the problem of verifying sequential clock gating by reducing the sequential problem into much smaller problems that may be more easily solved are described hereinbelow.

Figure 1:
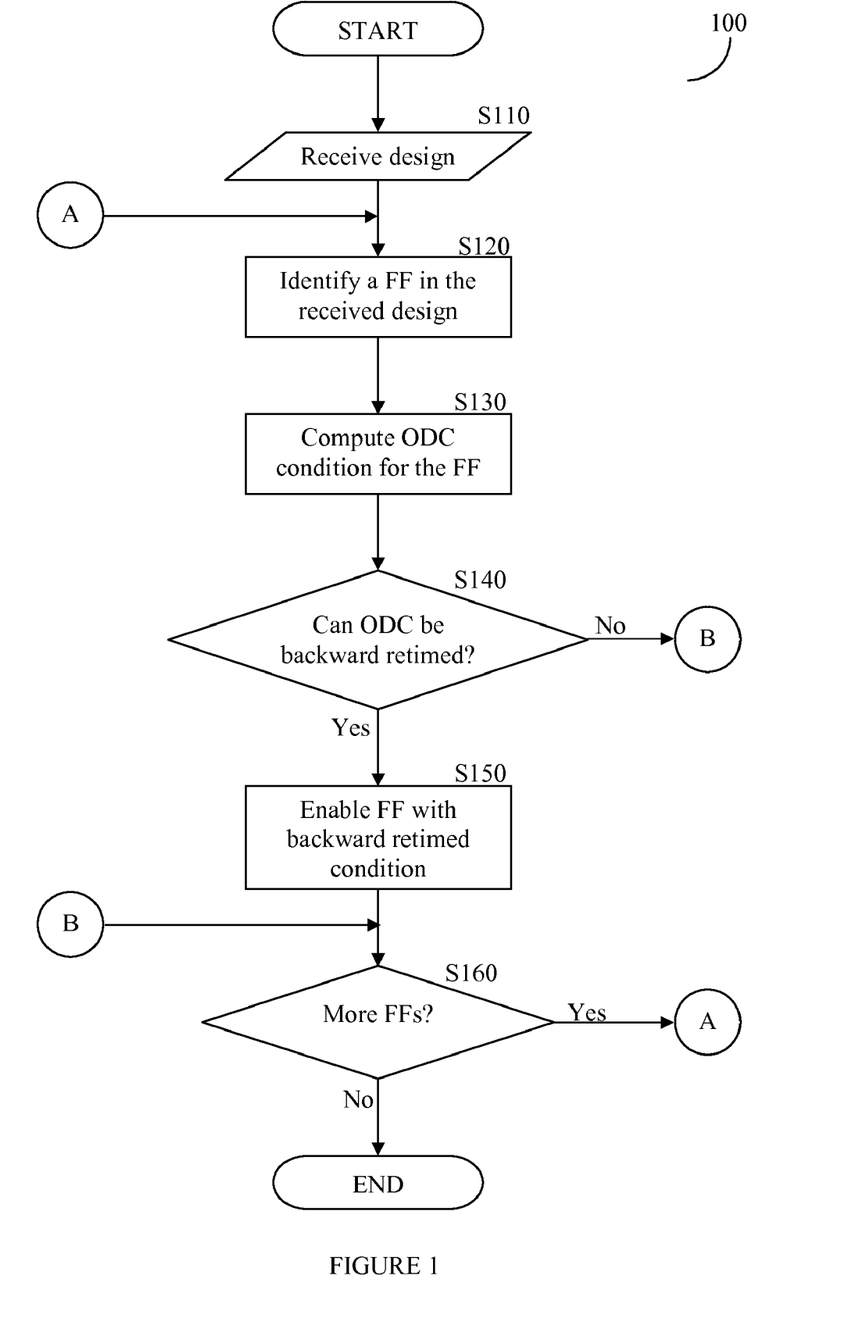
FIG. 1—is a flowchart of an observability don't care method for enabling a FF in accordance with an exemplary implementation of the present invention.

Reference is now made to FIG. 1 depicting an exemplary and non-limiting flowchart 100 of an observability don't care (ODC) method for enabling a FF in accordance with an exemplary implementation of the present invention. In S110 a design including a a plurality of circuits is received; the plurality of circuits may comprise, for example, an integrated circuit (IC) or portion thereof. In S120 a FF in the received design is identified from a plurality of FFs contained therein. In S130 the ODC of the FF is computed. The ODC provides the condition for which the FF is not observable for each ending point of its fanout. If the ODC is true at time T then the FF can keep its previous value at time T−1. If the ODC can be backward retimed then the backward retimed condition can be used to enable the FF. Therefore, in S140 it is checked whether the ODC of the FF can be backward retimed and if so execution continues with S150; otherwise, execution continues with S160. In S150 the circuit of the FF is changed to enable the FF with the backward retimed condition. In S160 it is checked whether additional FFs are to be checked and if so execution continues with S120; otherwise, execution terminates.

Figure 2:
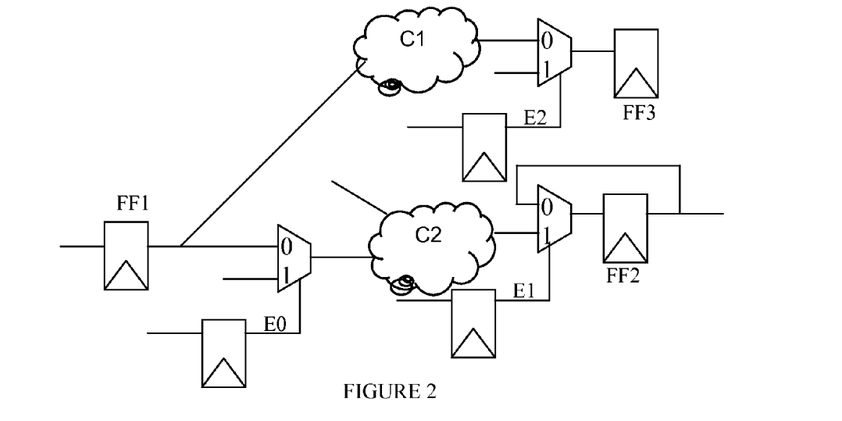
FIG. 2—is a first circuit analyzed in accordance with the principles of the invention.

To further understand the principles of the invention reference is now made to FIG. 2 showing exemplary and non limiting circuit 200 being analyzed in accordance with the principles of the invention. The circuit 200 includes combinational logic circuits C1 and C2. In this example FF1 is not observable if:

$$(E0==1||E1==0)\&\&(E2==1) \quad (1)$$

The signals E0, E1 and E2 can be backward retimed as they are all outputs of FFs. Therefore the following is a condition to clock gate FF1:

$$\sim((E0(T-1)||\sim E1(T-1)) \&\& E2(T-1))) \quad (2)$$

It should be noted that ~((E0(T−1) && E2(T−1))) and ~((~E1(T−1)) && E2(T−1))) can also be solutions to clock gate FF1. It should be noted that if E2 was a primary input, then it would not be possible to clock gate FF1 as it would not be possible to backward retime the signal E2.

Figure 3:
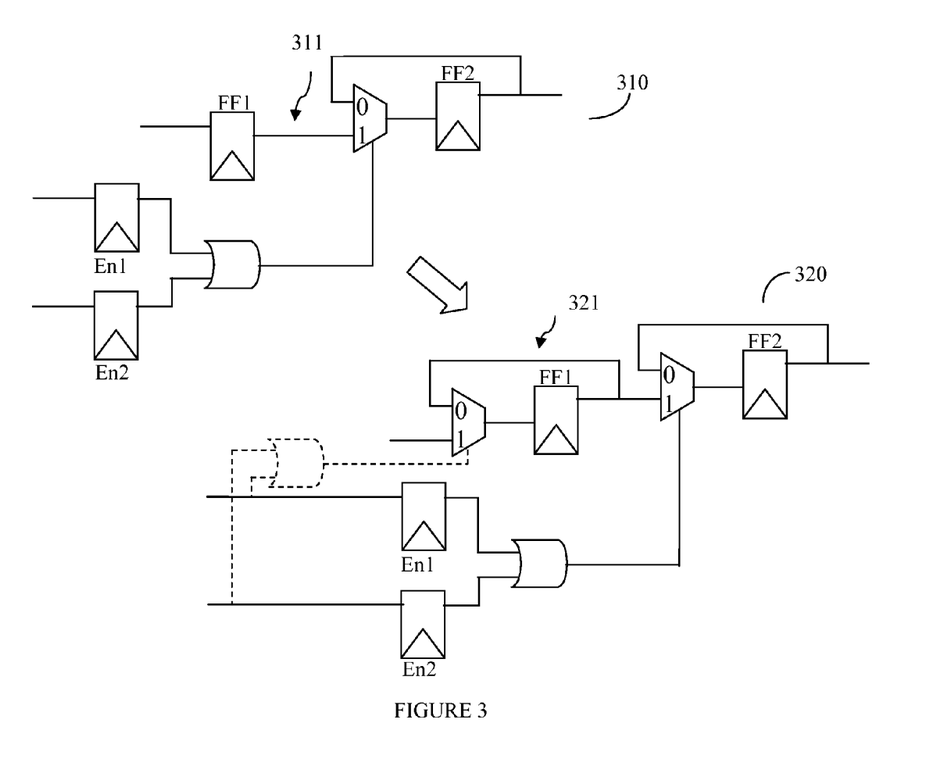
FIG. 3—is a first schematic of a golden circuit and an implementation circuit in accordance with an exemplary implementation of the present invention.

To even better understand the principles of the invention reference is now made to the FIG. 3 where both a golden circuit 310 and an implementation circuit 320 are shown. The state function of FF1 has changed between the golden circuit 310 and the implementation circuit 320. Therefore the equivalence of FF1 in the golden circuit 310 and implementation circuit 320 cannot be simply determined. As the FFs are not equivalent, it is not possible to replace them by a new primary input (PI) as classical combinational equivalence checking would do. However, it is possible to see that if the enable signal found for FF1 is:

$$Enff1=En1(T-1)||En2(T-1)=1 \quad (3)$$

then FF1 of the golden design, also referred to herein as FF1_g, and FF1 of the implemented design, also referred to herein as FF1_imp, are equivalent. In terms of this disclosure, FF1 may also be clock-gated by ANDing Enff1 with the clock signal of FF1 and providing the output of the ANDing to the clock input/enable node of FF1.

Figure 4:
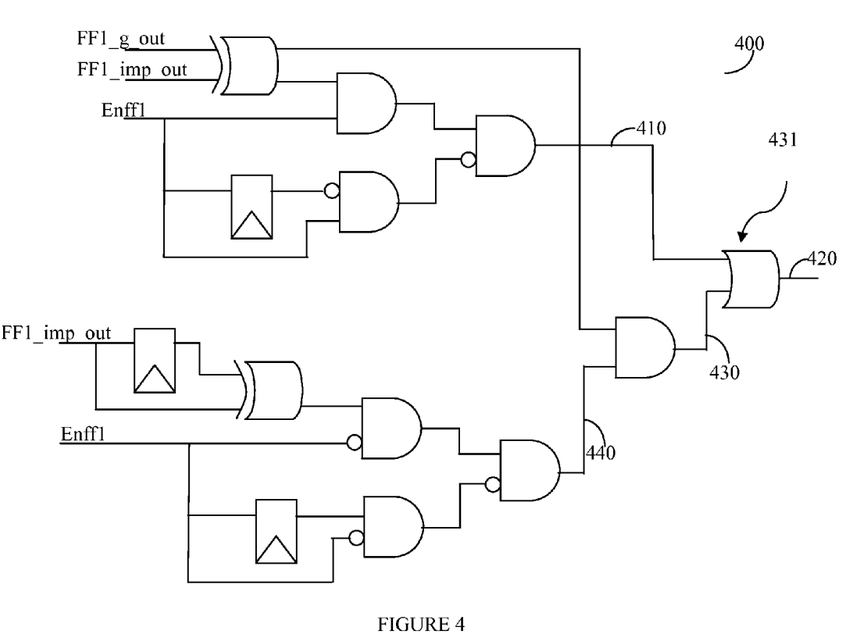
FIG. 4—is a schematic of a model to enable a correctness check of the implementation of the clock gating in accordance with an exemplary implementation of the present invention.

In the implementation circuit 320 illustrated in FIG. 3, during a transition of Enff1 from '0' to '1', the FF can be different, as this transition may happen during a clock cycle and make FF1_g and FF1_imp different. In addition when Enff1=0, then FF1 should keep its previous value, i.e., the self loop should hold. However, during a transition of Enff1 from '1' to '0', the self loop may not hold as the transition may happen during a clock cycle. If clock gating is not implemented then the self loop checking should not be performed. Based on this one can now model the problem to enable a correctness check of the implementation of the clock gating version of FF1, as shown in FIG. 4. In FIG. 4, the correctness check is performed based on FF1_g_out 311, which is the output of FF1 in the golden design and FF1_imp_out 321, which is the output of FF1 in the implementation design. To build the functionality of Enff1 in the model the equation provided to the user by a power reduction tool is typically used. At output 410 it is checked that FF1_g and FF1_imp are equivalent when Enff1 is '1' (ODC is 1) and there was no transition from '0' to '1'. At output 410 it is checked if the circuit is stuck at '0'. At output 430 it assured that if the clock gating was not implemented then the self loop hold should not be checked. At output 440 it is checked that the self loop holds when enable is '0' (ODC is 0) and there is no transition from '1' to '0'. OR gate 431 outputs the final result 420, which is needed to combine both checks from outputs 410 and 430. This model is referred as the ODC model in accordance with the principles of the invention.

Figure 5:
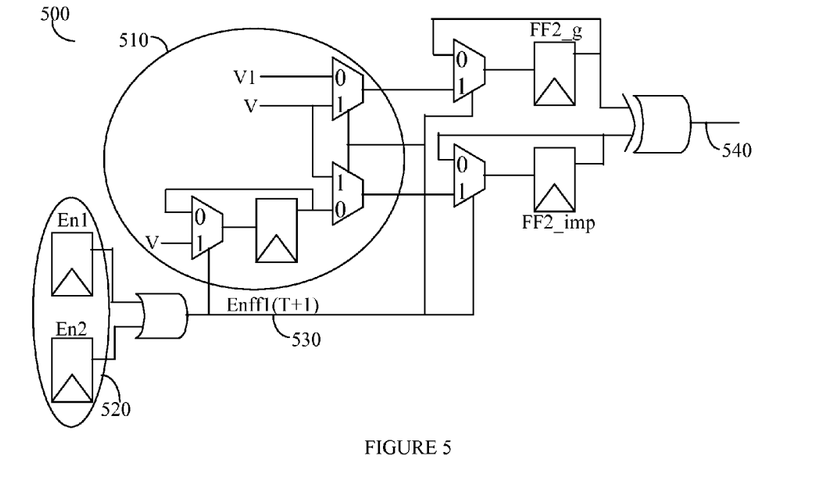
FIG. 5—is a schematic diagram of a cut and replace using the disclosed observability don't care model in accordance with an exemplary implementation of the present invention.

FIG. 5 shows an exemplary and non-limiting cut and replace diagram 500 using the disclosed ODC model. Once, it is verified that FF1_g and FF1_imp are equivalent, it is next checked whether the output of the original circuit remains the same. The cut 510 itself is referred to herein as the ODC-cut model. By applying the ODC model, a cut and connect of the fanout of FF1_gold and FF1_impl may be performed. The cut should model the following: FF1_gold and FF1_impl are equivalent when Enff1 is equal to '1'. When Enff1 is equal to '0' then the two FFs are different but FF1_impl keeps its previous value, which is the one loaded when enable was '1'. In 510, it is shown how FF1_g and FF1_imp are replaced by the cut 510. In 520, it is shown that En1 and En2 are replaced by PI and shared between the gold design and the implemented design as their functionality did not change. The Enff1 530 is retimed forward so it is the same as the enable of FF2. The output 540 checks the equivalence of FF2.

Figure 6:
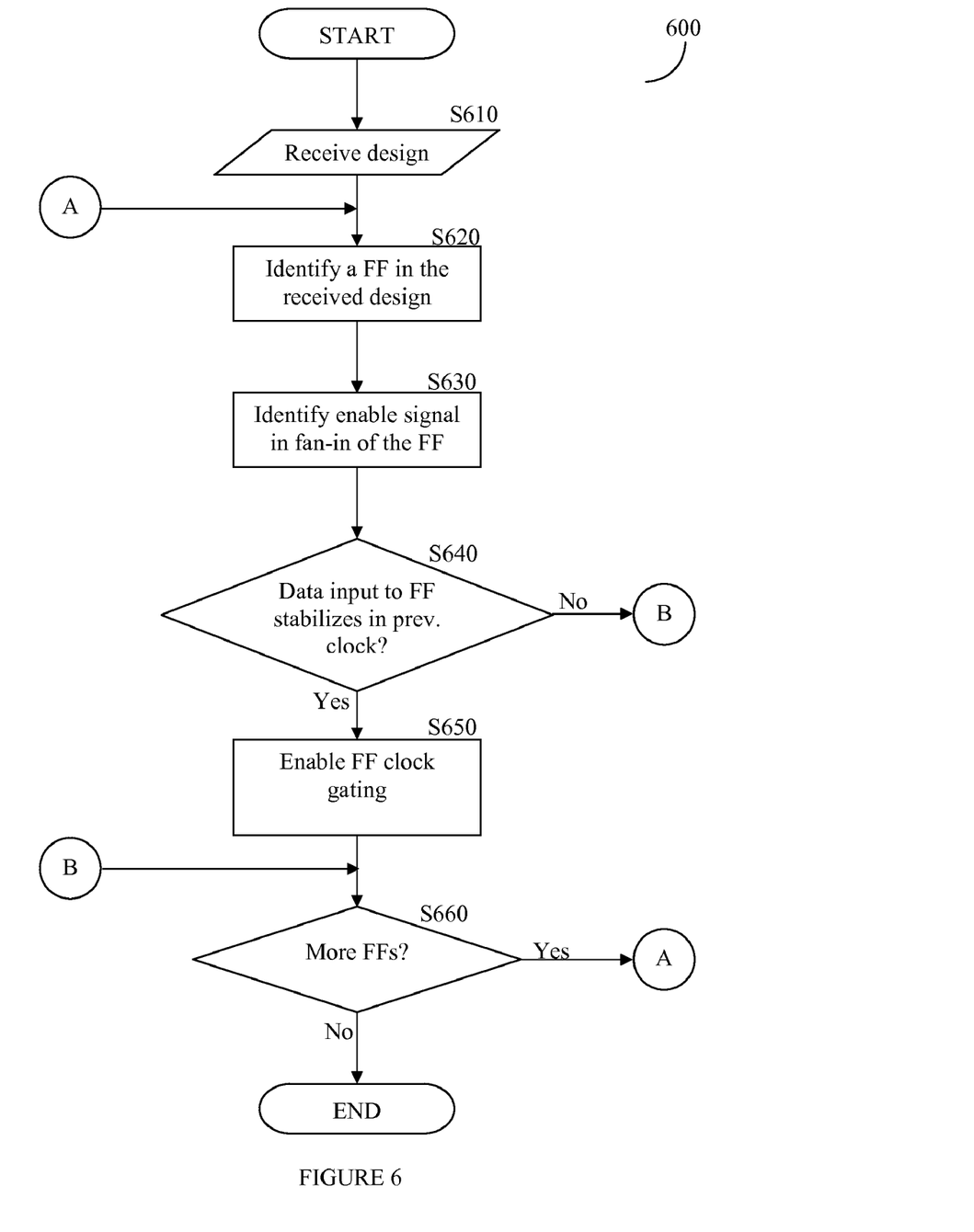
FIG. 6—is a flowchart of a stability condition method for clock-gating a FF in accordance with an exemplary implementation of the present invention.

Another approach involves stability condition (STC) analysis. It looks for enables in the fan-in cone of a FF element. If the data input of the FF stabilizes in the previous cycle, under some condition, then the FF can be gated with that condition in the current cycle. Reference is now made to FIG. 6 depicting an exemplary and non-limiting flowchart 600 of STC method for clock-gating a FF in accordance with the principles of the invention. In S610 a design is received containing a plurality of circuits that comprise, for example, an IC or portion thereof. In S620 a FF in the design is identified from a plurality of FFs contained therein. In S630 an enable signal of the FF is identified in the fan-in cone. In S640 it is checked whether the data input to the FF stabilizes under some condition within the previous cycle and if so execution continues with S650; otherwise, execution continues with S660. In S650 the clock-gating is enabled for the FF. In S660 it is checked whether additional FFs are to be checked and if so execution continues with S120; otherwise, execution terminates. More generally speaking, the STC of the FF determines the condition to clock gate the FF. The STC of a PI is '0' as it never stabilizes; the STC of a constant is '1' as it is already stable; the STC of a gated FF with enable En is ~En; the STC of a combinational gate is the AND of the STC of its inputs or any condition that stabilizes its output. For example, STC of a one-shot multiplexer, with k selectors sel1, sel2, . . . , selk and k inputs d1, . . . dk is:

$$STC=sel1 \& STC(sel1) \& STC(d1)|| \ldots selk \& STC(selk) \& STC(dk) \quad (4)$$

If a MUX is connected to a PI and a gate FF with enable En with function (PI & ~sel)||(Flop & sel), then the STC of this MUX is $$STC=sel \& STC(sel1) \& STC(FF)||!sel \& STC(!sel1) \& STC(PI) \quad (5)$$

As the STC of the PI is 0, the STC reduces to sel & STC(sel1) & STC (FF). In the case where the sel is driven by a FF with enable !En1, then the STC becomes:

$$STC=sel \& \sim En1 \& \sim En \quad (6)$$

A person skilled in the art would readily note that that a stronger STC would be $$En1||E \quad (7)$$

Figure 7:
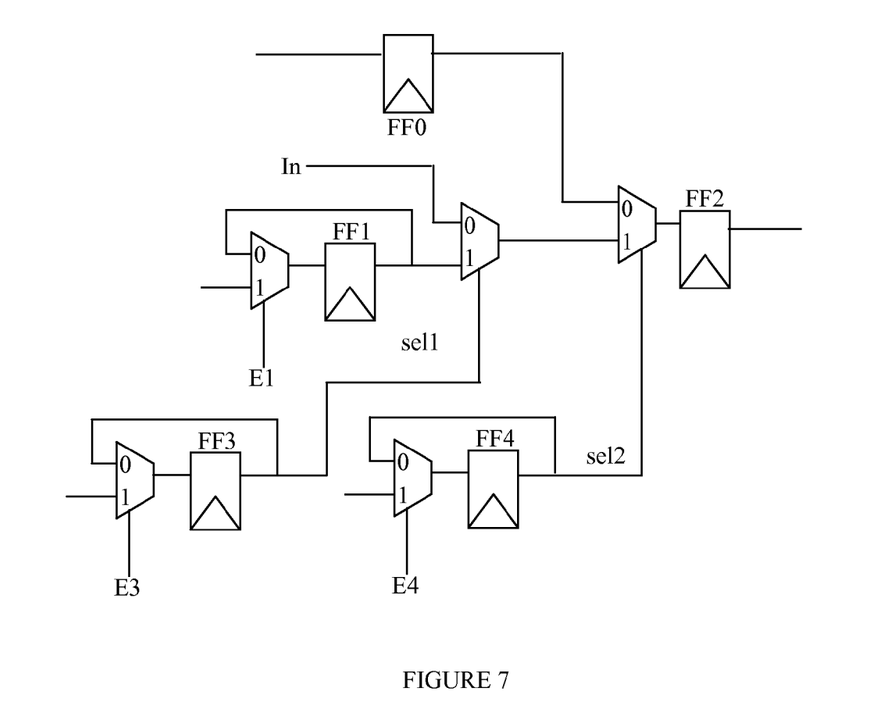
FIG. 7—is a second circuit analyzed in accordance with an exemplary implementation of the present invention.

To further understand the principles of the invention reference is now made to FIG. 7 showing an exemplary and non-limiting circuit 700 being analyzed in accordance with the principles of the invention. The STC of FF2 is:

$$(sel1 \&\& sel2 \&\& \sim E1) \quad (8)$$

and therefore it is possible to clock-gate FF2 with the following condition:

$$\sim sel1||\sim sel2||E1(T+1) \quad (9)$$

Figure 8:
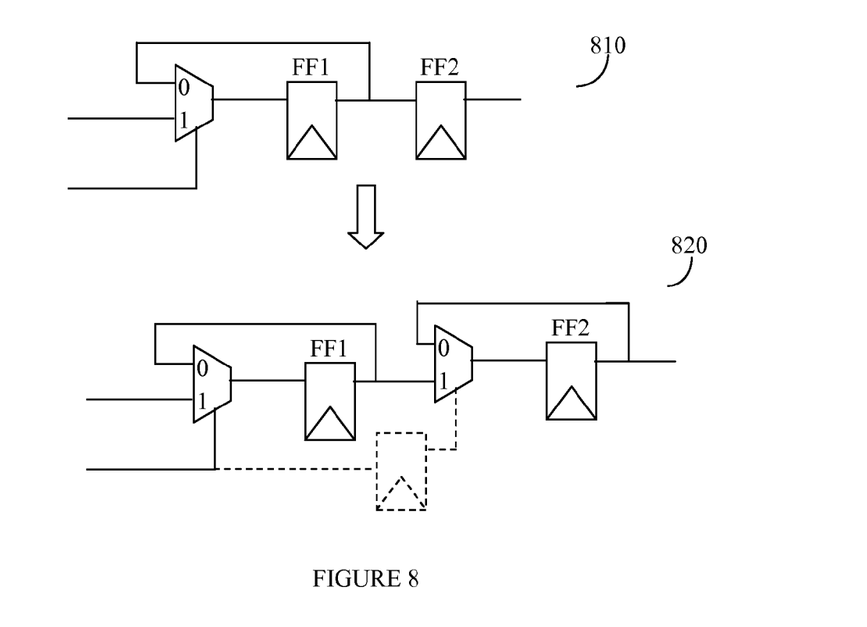
FIG. 8—is a second schematic of a golden circuit and an implementation circuit in accordance with an exemplary implementation of the present invention.

To even better understand the principles of the invention reference is now made to the exemplary and non-limiting FIG. 8 where both a gold circuit 810 and an implementation circuit 820 are shown. In this example the FF1_gold circuit 810 and FF1_imp circuit 820 are equivalent. However when applying the CEC method and replacing the FF1_gold and FF1_imp by the same input variable, then the checking of the equivalence of FF2_gold and FF2_imp fails. However, instead of only verifying that FF1_gold is equivalent to FF1_imp, it is possible to verify that FF1_gold and FF1_imp are equivalent and that the self loop hold, i.e., FF1_imp keeps its previous value when the enable signal is '0'. This is done by using the same self loop checking used for the ODC-model (FIG. 4) and referred to herein as the STC model. That is, FF1_g_out and FF1_imp_out for FIG. 8 will be used as the inputs to the model described in FIG. 4.

Figure 9:
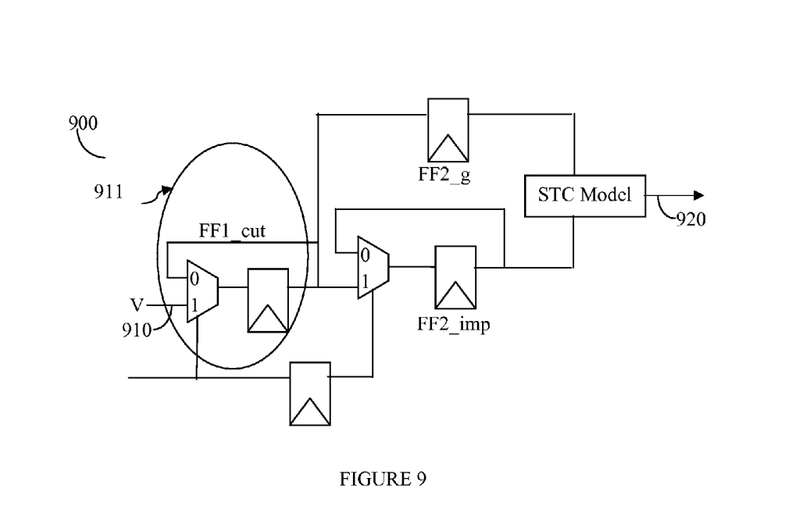
FIG. 9—is an STC cut for verifying the equivalence of a gold FF to an implementation FF in accordance with an exemplary implementation of the present invention.
Figure 10:
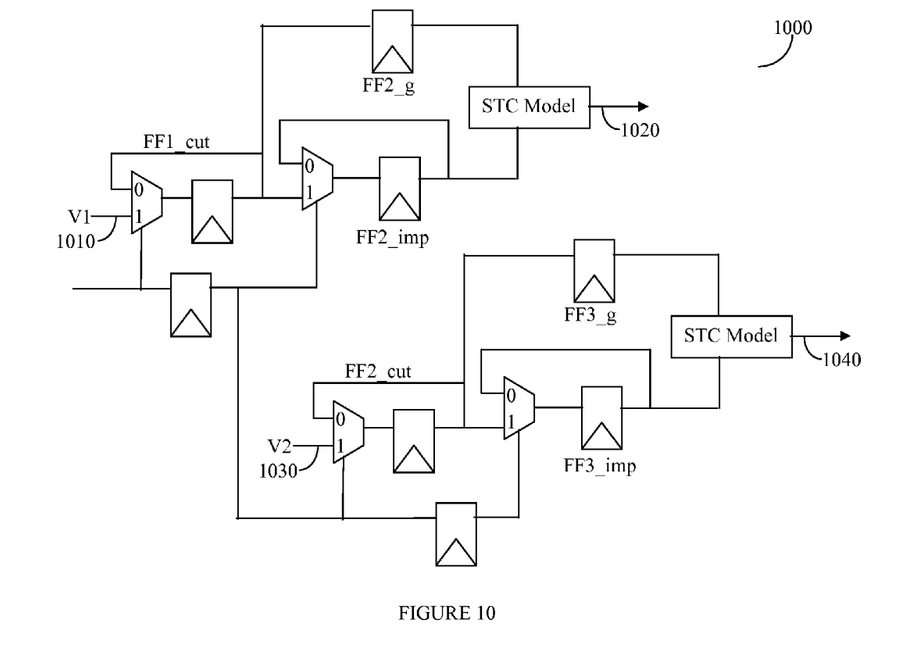
FIG. 10—is another STC cut for verifying the equivalence of a gold FF to an implementation FF in accordance with an exemplary implementation of the present invention.

The exemplary and non-limiting FIG. 9 depicts an STC cut 911 for verifying the equivalence of FF2_g and FF2_imp. The cut basically refers to a FF with a self-loop and connected to a new PI. At point 910 a new input variable is provided and at point 920 it is checked if it is stuck at '0'. In FIG. 10 a third FF, FF3 can be clock gated by retiming forward the enable of FF2. Thereafter the same verification as performed for FF1 and FF2 is performed for FF3, i.e., replacement by the same cut and verification of the equivalence of FF3. Then the process is repeated for all FFs in the transitive fanout of FF3 that can be optimized by STC. At points 1010 and 1030 new input variables are provided and at points 1020 and 1040 it is checked if they are stuck at '0'. Simply, the process is as follows: apply the STC model to the first FF in the pipeline, once the model verifies that the original FF design and implementation design are equivalent, the FF is replaced by the cut model, then the second flop in the pipeline is verified using the same STC model, replaced by the cut and the process continued until the last FF in the pipeline is reached.

Figure 11:
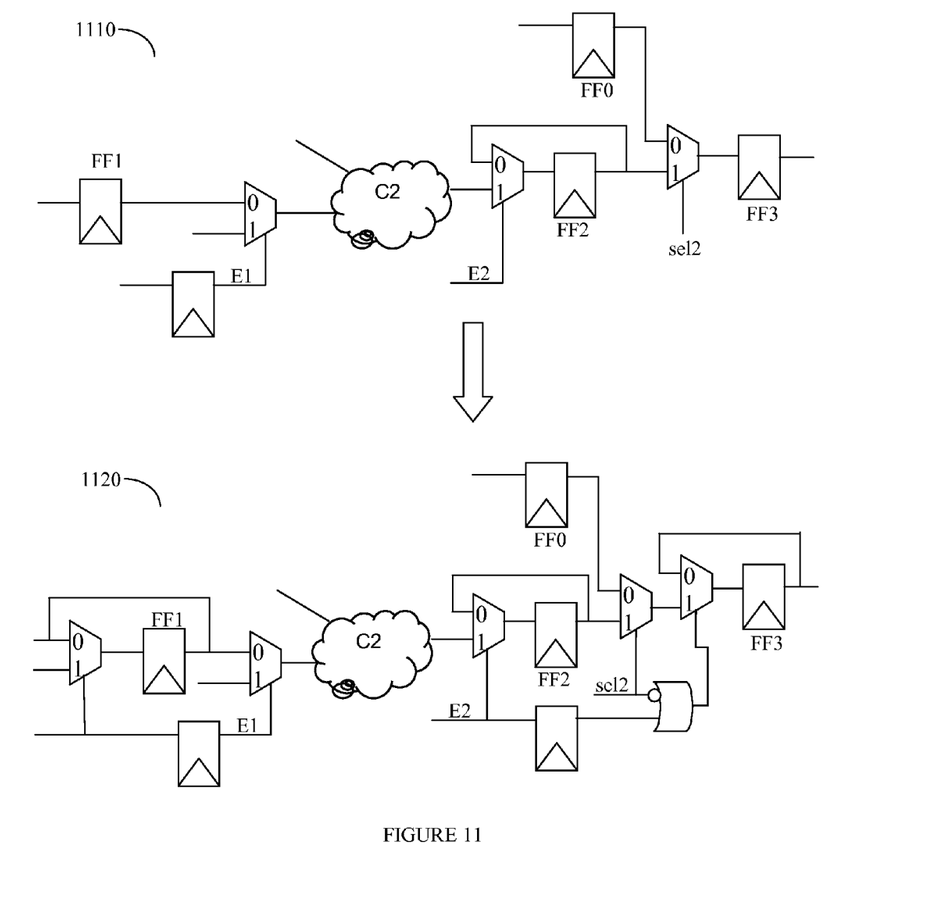
FIG. 11—is a schematic diagram showing a golden circuit and an equivalent implementation circuit designed in accordance with the an exemplary implementation of the present invention.

Reference is now made to FIG. 11 where a schematic diagram of a gold circuit 1110 and an equivalent implementation circuit 1120 that include combinational logic circuit C2, designed in accordance with the principles of the invention, are shown. The methods disclosed hereinabove show how to simplify the equivalence checking of a circuit optimized with clock gating and how clock gating optimizations is reduced into smaller circuit verification by performing models and cuts. For instance for the golden circuit 1110, the disclosed methods reduce the problem into three smaller problems: a) check ODC model for FF1 and perform the ODC cut; b) perform the STC model for FF2 and perform the STC cut; and c) perform the STC model for FF3 and perform the STC cut. Note that if FF2 would not have been involved in a STC optimization, then there would be no need to perform the STC model. Rather it would be necessary to merely verify that FF2_g and FF2_imp are equivalent and replace the FF by the same single variable.

Figure 12:
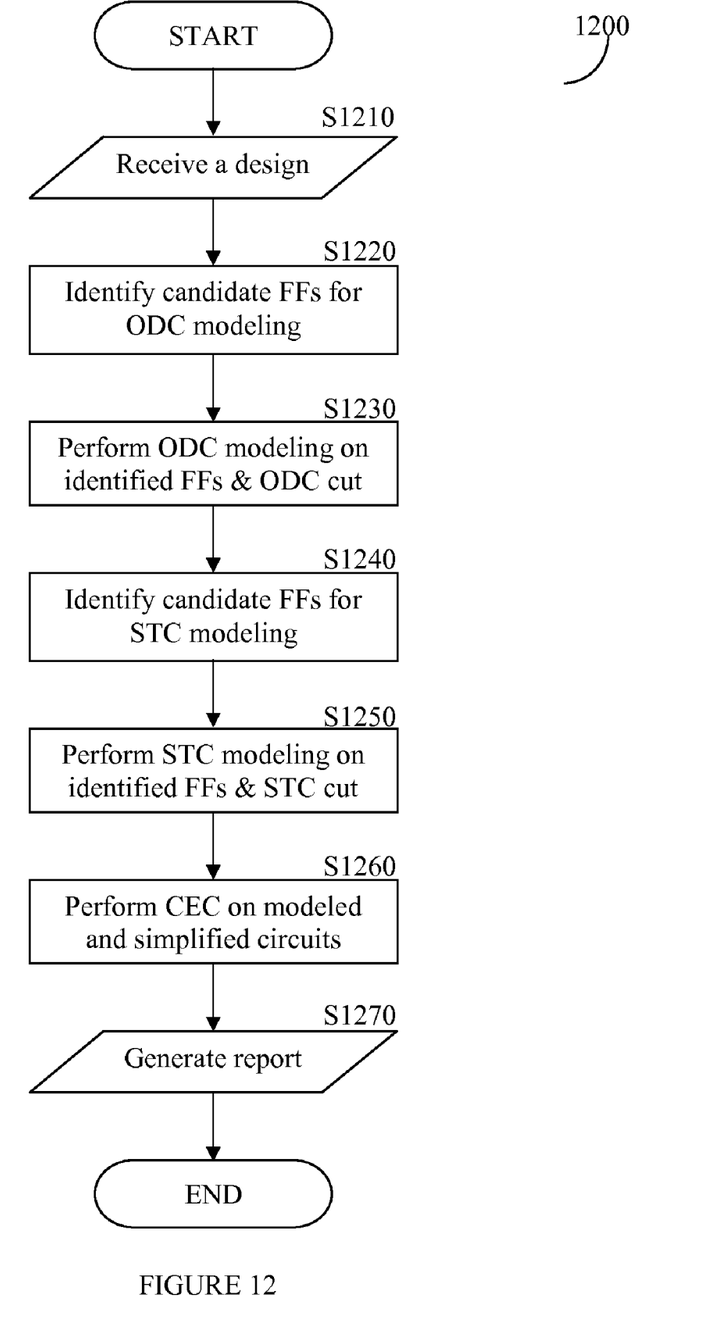
FIG. 12—is a flowchart of a process for performing equivalence check in accordance with an exemplary implementation of the present invention.

Reference is now made to FIG. 12 depicting a flowchart 1200 of the process for performing equivalence check in accordance with the principles of the invention. In S1210 a design is received, for example a design of an IC or a portion thereof. In S1220 a process, such a described herein above is used to identify FF candidates for performance of the ODC modeling. In S1230 an ODC modeling and ODC cut take place for each identified FF. In S1240 FF candidates for performance of the STC modeling are identified. In S1250 a STC modeling and STC cut take place for each identified FF. In S1260 a circuit equivalence check takes place on the modeled and simplified circuits. In S1270 a report is provided respective of the analyzed circuits. The method is preferably performed as part of a computer aided design (CAD) system and software thereof.

The principles of the invention are implemented as hardware, firmware, software or any combination thereof, including but not limited to a CAD system and software products thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for performing circuit equivalence check comprising:
   receiving a design of a circuit;
   identifying flip-flops (FFs) of the design which are candidates FFs for observability don't care (ODC) modeling;
   performing ODC modeling and ODC cuts on the identified FF for ODC modeling;
   identifying FFs of the design which are candidates FFs for stability condition (STC) analysis;
   performing STC analysis and STC cuts on the identified FF for STC analysis;
   performing equivalence checks on at least one of the circuits resulting from the ODC cuts and the circuits resulting from the STC cuts; and
   reporting circuit equivalence.

2. The method of claim 1, wherein said ODC modeling comprises:
   computing ODC conditions for each identified FF for ODC modeling; and
   identifying for each identified FF if backward retiming can be achieved and enabling backward retiming for FFs in which backward retiming can be achieved.

3. The method of claim 1, wherein said STC analysis comprises:
   identifying the enable signals in the fan-in of each identified FF for STC analysis; and
   identifying for each identified FF if its respective enable signal stabilizes in an immediately preceding cycle and enabling clock-gating for the FF using the respective enable signal if the enable signal for the identified FF stabilizes in an immediately preceding cycle.

4. The method of claim 1, wherein the design system is a computer aided design (CAD) system.

5. The method of claim 1, wherein the reporting is one of: printing a report, displaying a report.

6. A computer program product embodied on tangible media readable by a computing system and on which a plurality of instructions are embedded, wherein the instructions when executed on the computing system perform circuit equivalence check comprising the steps of:
   receiving a design of a circuit;
   identifying flip-flops (FFs) of the design which are candidates FFs for observability don't care (ODC) modeling;

performing ODC modeling and ODC cuts on the identified FF for ODC modeling;
identifying FFs of the design which are candidates FFs for stability condition (STC) analysis;
performing STC analysis and STC cuts on the identified FF for STC analysis;
performing equivalence checks on at least one of the circuits resulting from the ODC cuts and the circuits resulting from the STC cuts; and
reporting circuit equivalence.

7. The computer program product of claim 6, wherein said ODC modeling comprises:
   computing ODC conditions for each identified FF for ODC modeling; and
   identifying for each identified FF if backward retiming can be achieved and enabling backward retiming for FFs in which backward retiming can be achieved.

8. The computer program product of claim 6, wherein said STC analysis comprises:
   identifying the enable signals in the fain-in of each identified FF for STC analysis; and
   identifying for each identified FF if its respective enable signal stabilizes in an immediately preceding cycle and enabling clock-gating for the FF using the respective enable signal if the enable signal for the identified FF stabilizes in an immediately preceding cycle.

9. The computer program product of claim 6, wherein the design system is a computer aided design (CAD) system.

10. The computer program product of claim 6, wherein the reporting is one of: printing a report, displaying a report.

11. A design system for performing circuit equivalence check comprising:
    a storage;
    a processing unit coupled to the storage; and
    at least one of a display or printing unit coupled to processing unit;
    the storage containing a plurality of instructions that when executed on the processing unit perform the tasks of:
    receiving a design of a circuit;
    identifying flip-flops (FFs) of the design which are candidates FFs for observability don't care (ODC) modeling;
    performing ODC modeling and ODC cuts on the identified FF for ODC modeling;
    identifying FFs of the design which are candidates FFs for stability condition (STC) analysis;
    performing STC analysis and STC cuts on the identified FF for STC analysis;
    performing equivalence checks on at least one of the circuits resulting from the ODC cuts and the circuits resulting from the STC cuts; and
    reporting circuit equivalence.

12. The system of claim 11, wherein the display is used to display a report of the equivalence check.

13. The system of claim 11, wherein said ODC modeling comprises:
    computing ODC conditions for each identified FF for ODC modeling; and
    identifying for each identified FF if backward retiming can be achieved and enabling backward retiming for FFs in which backward retiming can be achieved.

14. The system of claim 11, wherein said STC analysis comprises:
    identifying the enable signals in the fan-in of each identified FF for STC analysis; and
    identifying for each identified FF if its respective enable signal stabilizes in an immediately preceding cycle and enabling clock-gating for the FF using the respective enable signal if the enable signal for the identified FF stabilizes in an immediately preceding cycle.

15. The system of claim 11, wherein the system is a computer aided design (CAD) system.

* * * * *